US010511121B2

(12) United States Patent
Milroy et al.

(10) Patent No.: US 10,511,121 B2
(45) Date of Patent: Dec. 17, 2019

(54) CABLE CONNECTION ASSEMBLIES FOR MARINE PROPULSION, AND ASSOCIATED SYSTEMS AND METHODS

(71) Applicant: Pure Watercraft, Inc., Seattle, WA (US)

(72) Inventors: David Milroy, Kirkland, WA (US); Joe Sullivan, Seattle, WA (US); Kerwin M. Loukusa, Seattle, WA (US); Marc McKissack, Seattle, WA (US); Richard Wurden, Seattle, WA (US)

(73) Assignee: Pure Watercraft, Inc., Seattle, WA (US)

( * ) Notice: Subject to any disclaimer, the term of this patent is extended or adjusted under 35 U.S.C. 154(b) by 0 days.

(21) Appl. No.: 16/189,717

(22) Filed: Nov. 13, 2018

(65) Prior Publication Data

US 2019/0148876 A1 May 16, 2019

Related U.S. Application Data

(60) Provisional application No. 62/585,494, filed on Nov. 13, 2017.

(51) Int. Cl.
*H01R 13/53* (2006.01)
*H01R 13/52* (2006.01)
(Continued)

(52) U.S. Cl.
CPC ......... *H01R 13/5221* (2013.01); *B63H 21/17* (2013.01); *B63H 21/28* (2013.01);
(Continued)

(58) Field of Classification Search
CPC ............ H01R 13/5221; H01R 13/5219; H01R 13/707; H01R 13/53; H01R 13/111;
(Continued)

(56) References Cited

U.S. PATENT DOCUMENTS 3,841,396 A 10/1974 Knaebel et al.
4,009,677 A 3/1977 Croisant et al.
(Continued)

FOREIGN PATENT DOCUMENTS

CN 102069715 5/2011
DE 102013218674 3/2015
(Continued)

OTHER PUBLICATIONS

International Search Report and Written Opinion for International Patent Application No. PCT/US18/60822, Applicant: Pure Watercraft, Inc., dated Feb. 5, 2019, 9 pages.
(Continued)

*Primary Examiner* — Truc T Nguyen
(74) *Attorney, Agent, or Firm* — Perkins Coie LLP (57) ABSTRACT

Cable connection assemblies for marine propulsion, and associated systems and methods are disclosed. A representative connection assembly includes a multi-conductor cable having two high voltage power conductor lines, two low voltage power conductor lines, two interlock lines, and two signal lines. The assembly further includes a connector having a connector body carrying connection elements corresponding to each of the conductor lines, interlock lines, and signal lines. In further representative embodiments, one or more of the connection elements can be housed in corresponding insulating bodies. In still further representative embodiments, the assembly can be configured so that the high voltage lines are the first to mate, and the last to un-mate, which, together with the interlock loop, can reduce or eliminate the likelihood for high voltage arcing.

22 Claims, 11 Drawing Sheets

(51) Int. Cl.
*B63H 20/14* (2006.01)
*B63H 21/17* (2006.01)
*H01R 13/523* (2006.01)
*H01R 13/627* (2006.01)
*H01R 13/11* (2006.01)
*H01M 2/20* (2006.01)
*H01R 13/707* (2006.01)

(52) U.S. Cl.
CPC .......... *H01M 2/206* (2013.01); *H01R 13/111* (2013.01); *H01R 13/523* (2013.01); *H01R 13/5219* (2013.01); *H01R 13/53* (2013.01); *H01R 13/6278* (2013.01); *H01R 13/707* (2013.01); *H01M 2220/20* (2013.01); *H01R 13/5227* (2013.01); *H01R 13/627* (2013.01); *H01R 2201/26* (2013.01)

(58) Field of Classification Search
CPC .............. H01R 13/6278; H01R 13/523; H01R 2201/26; H01R 13/627; H01R 13/5227; H01M 2/206; H01M 2220/20; B63H 21/17; B63H 21/28
See application file for complete search history.

(56) References Cited

U.S. PATENT DOCUMENTS

| | | | |
|---|---|---|---|
| 4,092,946 A | 6/1978 | Kappas | |
| 4,099,478 A | 7/1978 | Alexander, Jr. | |
| 4,305,012 A | 12/1981 | Friedel | |
| 4,568,289 A | 2/1986 | Heidrich et al. | |
| 5,296,797 A | 3/1994 | Bartlett | |
| 5,385,476 A * | 1/1995 | Jasper | H01R 13/6633 439/38 |
| 5,445,545 A | 8/1995 | Draper | |
| 5,571,023 A | 11/1996 | Anthony | |
| 5,580,266 A * | 12/1996 | Shelly | H01R 13/53 439/281 |
| 5,588,853 A | 12/1996 | Anthony | |
| 5,596,258 A | 1/1997 | Kimura et al. | |
| D378,292 S | 3/1997 | Yoshioka | |
| 5,626,486 A * | 5/1997 | Shelly | H01R 13/53 439/273 |
| 5,967,863 A | 10/1999 | Marchant | |
| 6,203,355 B1 * | 3/2001 | Neblett | H01R 13/62933 439/372 |
| 6,224,428 B1 * | 5/2001 | Chen | H01R 33/9655 439/188 |
| 6,231,407 B1 | 5/2001 | Hein et al. | |
| 6,865,280 B2 | 3/2005 | Lin | |
| D523,812 S | 6/2006 | Brodin | |
| 7,270,074 B2 | 9/2007 | Pradetto et al. | |
| 7,641,499 B1 * | 1/2010 | George | B60L 3/0069 439/352 |
| D649,938 S | 12/2011 | Erickson et al. | |
| D649,939 S | 12/2011 | Erickson et al. | |
| 8,658,299 B2 | 2/2014 | Yang et al. | |
| 2004/0130292 A1 | 7/2004 | Buchanan et al. | |
| 2005/0275372 A1 | 12/2005 | Crowell | |
| 2008/0268333 A1 | 10/2008 | Barrella et al. | |
| 2010/0248562 A1 | 9/2010 | Daikoku | |
| 2010/0291418 A1 | 11/2010 | Zhou et al. | |
| 2011/0260684 A1 | 10/2011 | Xiaofeng et al. | |
| 2011/0263165 A1 | 10/2011 | Rolla | |
| 2011/0291611 A1 | 12/2011 | Manor | |
| 2012/0074901 A1 | 3/2012 | Mohammed | |
| 2012/0153899 A1 | 6/2012 | Marschalkowski et al. | |
| 2012/0171900 A1 | 7/2012 | Seabald et al. | |
| 2012/0282497 A1 | 11/2012 | Yang et al. | |
| 2012/0282825 A1 | 11/2012 | Lin | |
| 2013/0049677 A1 | 2/2013 | Bouman | |
| 2013/0078839 A1 * | 3/2013 | Musk | H01R 13/631 439/345 |
| 2013/0229072 A1 | 9/2013 | Matsuda | |
| 2014/0187107 A1 | 7/2014 | Gemin et al. | |
| 2014/0273571 A1 | 9/2014 | Iyer et al. | |
| 2014/0377990 A1 * | 12/2014 | Saller | H01R 4/10 439/582 |
| 2015/0017841 A1 | 1/2015 | Chen | |
| 2015/0077040 A1 | 3/2015 | Longdon et al. | |
| 2015/0130421 A1 | 5/2015 | Bevilacqua, III | |
| 2015/0325961 A1 * | 11/2015 | Blakborn | H01R 13/713 439/271 |
| 2015/0340806 A1 * | 11/2015 | Ilkhanov | H01R 13/6215 439/278 |
| 2015/0357692 A1 | 12/2015 | Piggott et al. | |
| 2015/0372279 A1 | 12/2015 | Li | |
| 2016/0111831 A1 | 4/2016 | Kawai et al. | |
| 2016/0114692 A1 | 4/2016 | Tripathi et al. | |
| 2016/0126679 A1 * | 5/2016 | Kim | H01R 13/6598 439/607.41 |
| 2016/0248192 A1 | 8/2016 | Hamada | |
| 2017/0279210 A1 * | 9/2017 | Kraemer | H01R 13/506 |
| 2018/0019535 A1 | 1/2018 | Uenosono et al. | |
| 2018/0029681 A1 | 2/2018 | Gil | |
| 2018/0048091 A1 | 2/2018 | Kawai et al. | |

FOREIGN PATENT DOCUMENTS

| | | |
|---|---|---|
| EP | 2372828 | 10/2011 |
| JP | 2005162055 | 6/2005 |
| WO | WO-2014021841 | 2/2014 |

OTHER PUBLICATIONS

"Compound Planetary Gear," Planetary Gear Train with Stepped Planet Gear Set—MATLAB, http://www.mathworks.com, accessed Aug. 25, 2017, 3 pages.

Nitrofreeze "Shrink Fitting," https://web.archive.org/web/20160724183319/http://nitrofreeze.com/services/custom-cryogenic-processing/shrink-fitting/, Jul. 24, 2016, 3 pages.

\* cited by examiner

CABLE CONNECTION ASSEMBLIES FOR MARINE PROPULSION, AND ASSOCIATED SYSTEMS AND METHODS

CROSS-REFERENCE TO RELATED APPLICATION

The present application claims priority to U.S. Provisional Application No. 62/585,494, filed Nov. 13, 2017, and incorporated herein by reference.

TECHNICAL FIELD

The present technology is directed generally to cable connection assemblies for marine propulsion (among other applications), and associated systems and methods.

BACKGROUND

Outboard motors have been used for many years to propel smaller boats and other watercraft. Conventional outboard motors typically include a two-stroke or four-stroke internal combustion engine. More recently, in response to consumer demand for quieter and more environmentally friendly outboard motors, manufacturers have begun producing electric outboard motors.

Generating power for electrically driven outboard motors presents several challenges. For example, the power provided by on-board batteries to the electric motor is generally provided at high current levels, resulting in heavy and/or unwieldy cables, which can be difficult to handle. In addition, electrically powered outboard motors typically require data connections, and arrangements that ensure secure connections among the components that power the boat. Accordingly, there remains a need in the industry for connection assemblies suitable for electric boat power, and/or other high-demand power installations.

DETAILED DESCRIPTION

The present technology is directed generally to cable connection assemblies for marine propulsion (among other applications), and associated systems and methods. In some embodiments, the cable connection assemblies include features specifically configured to make transmitting power and signals among system components easier, for example, by combining power lines, signal lines, and interconnect lines in a single cable, and/or configuring the sequence in which the connections are made to reduce or eliminate the likelihood for electrical arcing.

Specific details of several embodiments of the present technology are described below with reference to particular connection assembly configurations to provide a thorough understanding of the relevant components. In other embodiments, the technology can be applied to connection assemblies having other configurations. Several details describing structures and/or processes that are well-known and often associated with cables, batteries, outboard motors and/or electric motors, but that may unnecessarily obscure some significant aspects of the present technology, are not set forth in the following description for purposes of clarity. Moreover, although the following disclosure sets forth several embodiments of the present technology, several other embodiments of the technology can have different configurations and/or different components than those described in this section. As such, the present technology may have other embodiments, with additional elements and/or without several of the elements described below with reference to FIGS. 1-9. In FIGS. 1-9, features may not necessarily be drawn to scale, and certain features may be emphasized or omitted for purposes of clarity.

Figure 1:
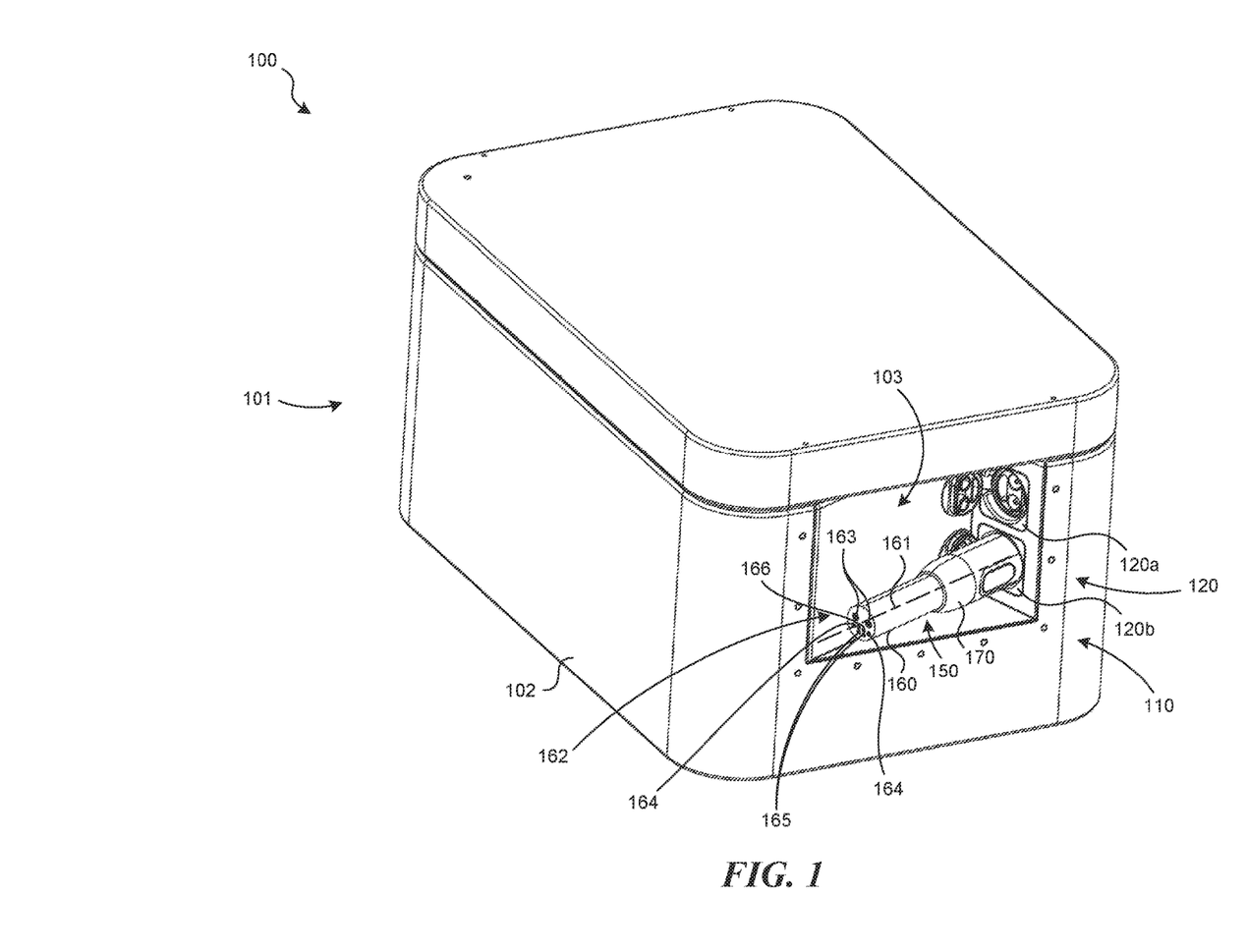
FIG. 1 is a partially schematic, isometric view of a power system that includes a battery pack configured in accordance with some embodiments of the present technology.

FIG. 1 is a partially schematic, isometric illustration of a power system 100 that includes at least one battery or battery pack 101. As used herein, the terms "battery" and "battery pack" are used interchangeably to refer to power storage devices that can include one or more electricity-producing cells, e.g., electro-chemical battery cells. Electrical power provided by the cells may be coupled to other battery packs and/or to an electric motor or other load via one or more cable assemblies 150.

In some embodiments, the battery pack 101 can include an enclosure 102 in which the battery cells are housed. The enclosure 102 can include a recess 103 in which one or more battery connectors 120 are positioned. In an embodiment shown in FIG. 1, two battery connectors 120*a*, 120*b* are positioned in the recess 103. The battery connectors 120 can be electrically connected to the internal battery cells and other internal circuitry, and can form a portion of an overall connection assembly 110 that includes the cable assembly 150. The cable assembly 150 can include a cable 160 (a terminal portion of which is shown in FIG. 1) that is elongated along a cable axis 161, and includes a cable connector 170 that releasably connects to either of the battery connectors 120*a*, 120*b*. The cable 160 can carry multiple electrical lines 162, cut ends of which are shown schematically in FIG. 1. The electrical lines 162 can include two high voltage power lines 163 (e.g., for powering an outboard electric motor), two low voltage power lines 164 (e.g., for powering low voltage circuitry), two signal lines 165 (e.g., for transmitting data to and/or from the battery pack 101), and two interlock lines 166 (for confirming when the cable assembly 150 is electrically engaged with the corresponding battery connector 120). The individual lines 162 can include single-element (solid) wires, multi-filar wires, and/or other suitable elongated conductors. Further details of the cable connector 170 and battery connector 120 are described below with reference to FIGS. 2-8B.

Figure 2:
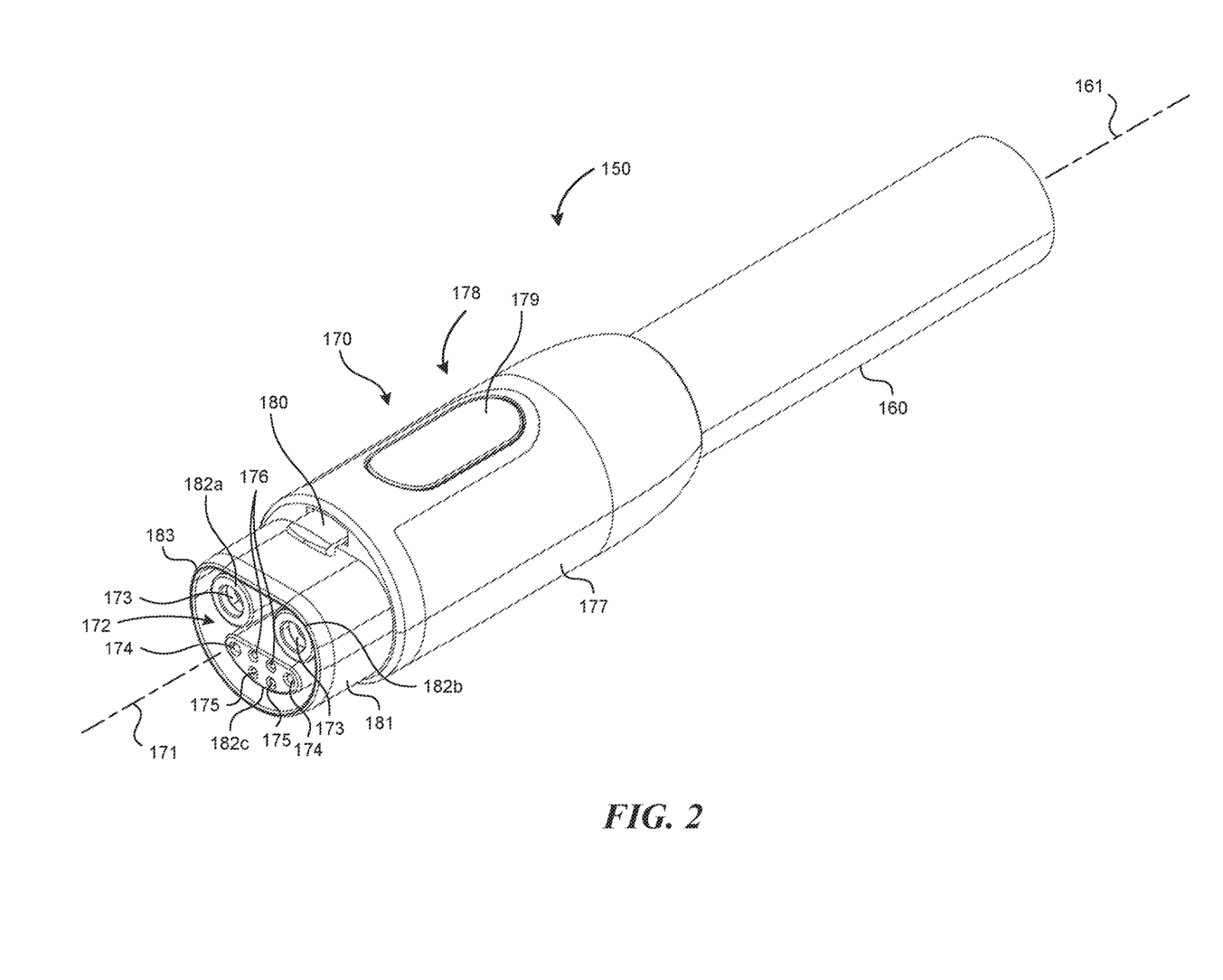
FIG. 2 is a partially schematic, isometric view of a cable assembly configured in accordance with embodiments of the present technology.

FIG. 2 is a partially schematic, isometric illustration of a portion of a representative cable 160 and cable connector 170. The cable connector 170 can include a body 177 (e.g., formed from metal, plastic, and/or another suitably durable, robust material). The body 177 can be elongated along a connector axis 171, and can include a flange 181 that extends outwardly from the body 177 along the connector axis 171. The flange 181 can be positioned around the electrically conductive elements of the cable connector 170 to provide physical protection for these elements, e.g., as the cable assembly 150 is connected to and disconnected from a battery connector 120 (FIG. 1) or other interface. When the flange 181 is formed from metal or another electrically conductive material, it can also shield the lines from electromagnetic interference (EMI), which can be particularly useful for the signal lines 165 (FIG. 1). Accordingly, the flange 181 can form a closed shape that encloses or encircles an interior volume in which connection elements 172 (described below) are housed.

Additional physical and/or electrical protection can be provided by one or more insulating bodies 182, shown as a first insulating body 182a, a second insulating body 182b, and a third insulating body 182c. The terminal ends of the insulating bodies 182 (visible in FIG. 2) can be spaced apart from each other to form corresponding projections. Each of the insulating bodies 182 can carry cable connection elements 172 that are electrically connected to the electrical lines 162 described above with reference to FIG. 1, and that provide a releasable electrical connection with corresponding connection elements carried by the battery connector 120 (described further below). For example, the first and second insulating bodies 182a, 182b, can each house a corresponding high voltage connection element 173. In the embodiment shown in FIG. 2, the high voltage connection elements 173 include electrically conductive, annular (female) elements, for example, cylinders, collars or sockets that interface with corresponding (male) elements carried by the battery connector 120. The third insulating body 182c can house cable connection elements 172 that carry data and/or low voltage transmissions. Accordingly the third insulating body 182c can include two low voltage connection elements 174 (connected to the low voltage power lines 164 described above with reference to FIG. 1), two signal connection elements 175 (connected to the corresponding signal lines 165 shown in FIG. 1), and two interlock connection elements 176 (connected to the corresponding interlock lines 166 shown in FIG. 1). Each of these connection elements 174, 175, 176 can have a cylindrical, collar-type, or socket shape. The flange 181 surrounds and protects the insulating bodies 182 and the corresponding cable connection elements 172, and includes an outer edge 183 that is received by the battery connector, as described later with reference to FIG. 5.

The body 177 can also carry a latch 178 for providing a secure, releasable connection between the cable connector 170 and the corresponding battery connector 120 (FIG. 1). In some embodiments, the latch 178 includes a spring-loaded latch actuator 179 connected to a corresponding latch element 180. The latch actuator 179 and latching element 180 can be biased to a latched position (shown in FIG. 2) so as to prevent or restrict the cable connector 170 from being inadvertently unlatched during operation. Further details of the latch 178 are described below with reference to FIGS. 4A and 4B.

Figure 3:
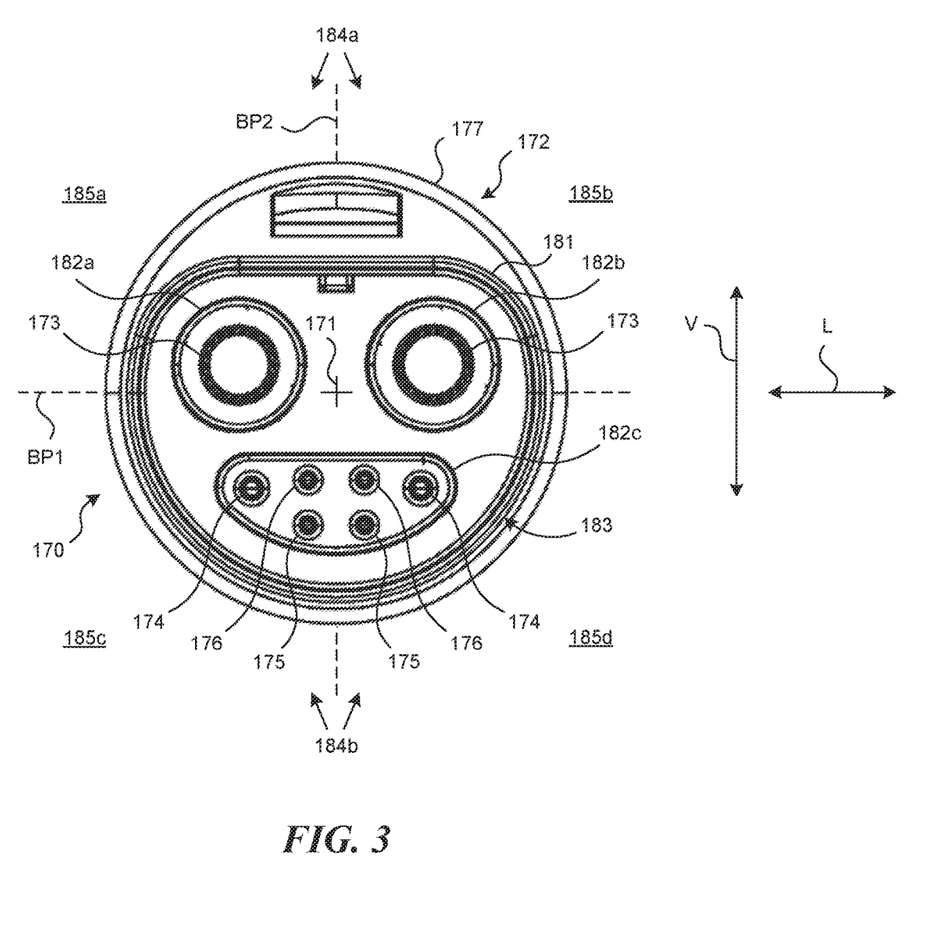
FIG. 3 is a partially schematic, end view of a cable assembly configured in accordance with some embodiments of the present technology.

FIG. 3 is a partially schematic, end view of the cable connector 170 configured in accordance with some embodiments of the present technology. As will be described further below, the cable connection elements 172 can be arranged so that the center of force (when attaching or detaching the cable connector 170) is on or near the connector axis 171. This arrangement can prevent cocking and/or otherwise misaligning the cable connector 170 on insertion, and/or can reduce the force required to plug and/or unplug the cable connector 170. This arrangement can be implemented by distributing the connection elements over two halves of the cable connector 170, or (as shown in FIG. 3), four quadrants of the cable connector 170.

As shown in FIG. 3, the cable connector 170 is bisected by a first bisecting plane BP1 (e.g., normal to a plane defined by the flange outer edge 183, and viewed end-on in FIG. 3) to form a first region 184a, and second region 184b. Some of the cable connection elements 172 are positioned (or partially positioned) in the first region 184a and others are positioned (or partially positioned) in the second region 184b. For example, the high voltage connection elements 173 are positioned at least partially in the first region 184a, and the remaining connection elements 174, 175, and 176 are positioned in the second region 184b. Positioning the cable connection elements 172 in both the first and second regions 184a, 184b can reduce the likelihood for the connector 170 to skew or otherwise become misaligned in at least a first (e.g., vertical) direction V when connected with the corresponding battery connector 120 (FIG. 1). In at least some embodiments, this approach can be used to reduce or prevent skewing in a second (e.g., lateral) direction L, in addition to or in lieu of the first direction V. Accordingly, and as is also shown in FIG. 3, a second bisecting plane BP2 together with the first bisecting plane BP1 forms four quadrants 185a, 185b, 185c, and 185d. The cable connection elements 172 are distributed so that at least some cable connection elements 172 are positioned, or at least partially positioned, in each of the four quadrants. This approach can further reduce the likelihood for skewing the cable connector 170 when it is connected.

With continued reference to FIG. 3, the connector 170 can be water-resistant (e.g., configured to be water-tight under at least some conditions) when disconnected and when connected with the corresponding battery connector 120 (FIG. 1). The configuration can include an IP67-rated seal, which allows the connection to remain electrically intact for at least one half hour while being submerged in one meter of water. For example, the cable connector 170 and/or the corresponding battery connector 120 can include an elastomeric seal that seals the interface between the two connectors when the connecters are joined.

Figure 4A:
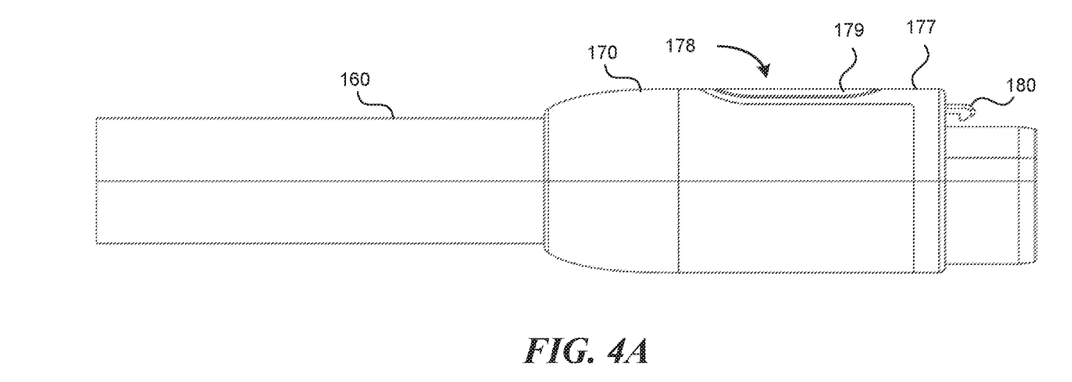
FIGS. 4A-4B are partially schematic illustrations of a cable assembly having a latching arrangement configured in accordance with some embodiments of the present technology.
Figure 4B:
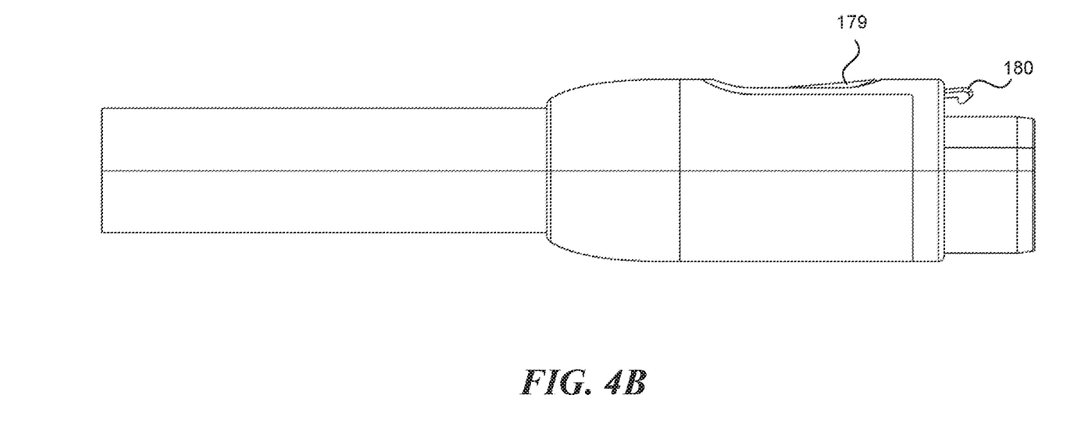

FIG. 4A is a partially schematic, side elevation view of the cable connector 170, with the latch 178 in a latched position. In this configuration, the latch actuator 179 is flush with the adjacent outer surface of the body 177, and the latching element 180 is positioned in a horizontal, latched orientation. As shown in FIG. 4B, an operator has pressed the latch actuator 179 downwardly, raising the latching element 180 from the position shown in FIG. 4A, and allowing the user to pull the cable connector 170 to the left so as to disengage it from the corresponding battery connector 120. Further details of the battery connector 120 are described below with reference to FIG. 5.

Figure 5:
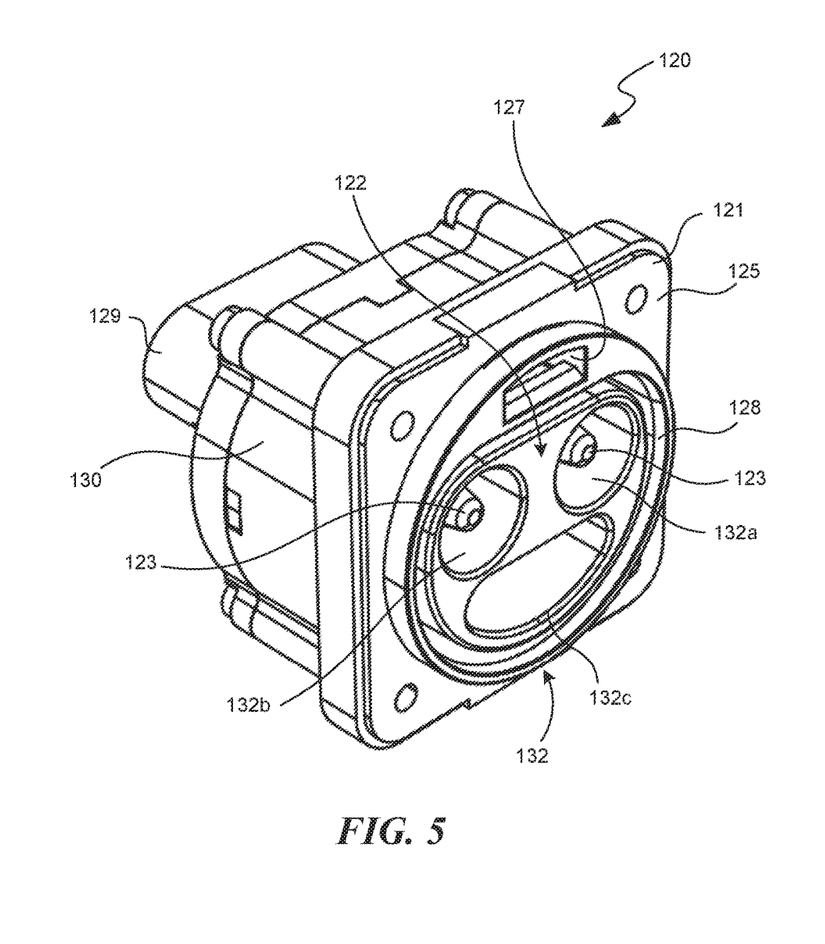
FIG. 5 is a partially schematic, isometric view of a battery connector configured in accordance with some embodiments of the present technology.

FIG. 5 is a partially schematic, isometric illustration of a representative battery connector 120 configured in accordance with some embodiments of the present technology. The battery connector 120 can include a body 130 having a faceplate 121 that interfaces with the enclosure 102 described above with reference to FIG. 1. The body 130 can include one or more receptacles 132 configured to receive corresponding elements of the cable connector 170 described above with reference to FIG. 2. For example, the body 130 can include a first insulating body receptacle 132a, a second insulating body receptacle 132b, and a third insulating body receptacle 132c that receive, respectively, the first insulating body 182a, the second insulating body 182b, and the third insulating body 182c of the cable connector 170. The body 130 can further include a flange receptacle 128 that receives the flange 181 of the cable connector 170, and a latch receptacle 127 that receives the latching element 180 of the cable connector 170.

The battery connector 120 can further include battery connection elements 122 that interface with the corresponding cable connection elements 172 of the cable connector 170. Accordingly, the battery connection elements 122 can include high voltage connection elements 123 that interface with the corresponding high voltage connection elements 173 of the cable connector 170, and low voltage connection elements, signal connection elements, and interlock connection elements positioned within the third insulating body receptacle 132c (but not visible in FIG. 5). Each of the battery connection elements 122 can have a pin or other male-shaped configuration to interface with the corresponding female configurations of the cable connection elements 172. Each of the battery connection elements 122 can extend to, or be connected to, an internal wiring boss 129 that in turn receives cables or other electrically conductive elements connected to a variety of circuits, battery cells, and/or other features within the battery pack 101 (FIG. 1).

Figure 6:
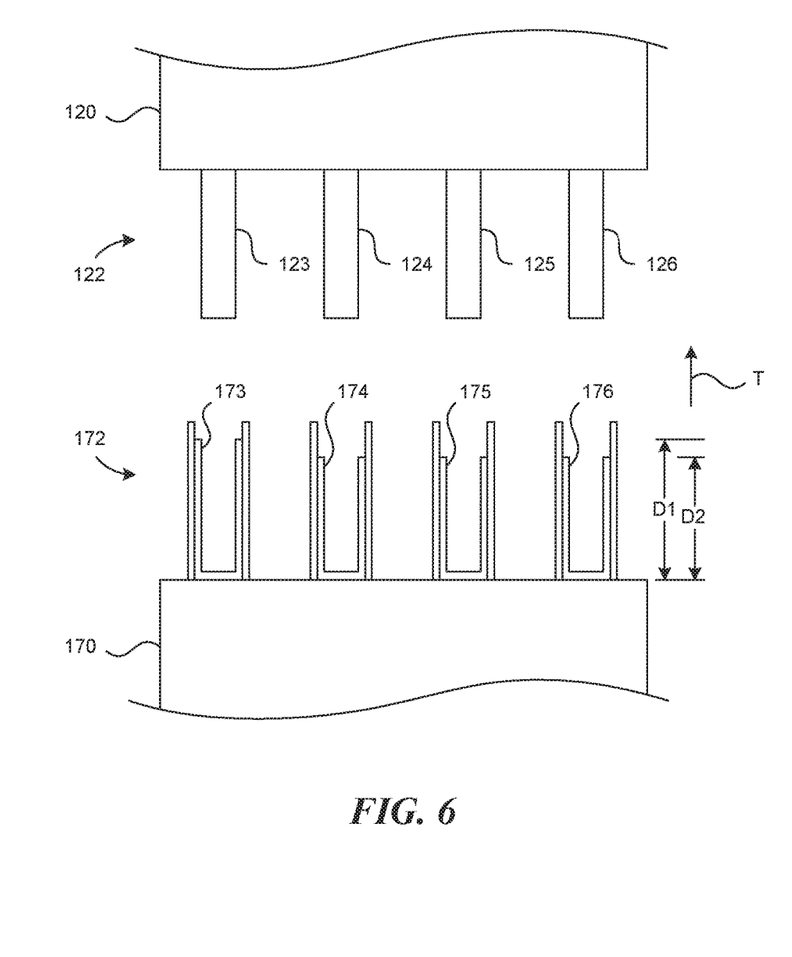
FIG. 6 is a partially schematic, side elevation view of a battery connector and cable connector configured to provide sequenced electrical connections in accordance with some embodiments of the present technology.

In some embodiments, the cable connector 170 and/or the battery connector 120 are configured so that the high voltage connection elements are the first to mate with each other, and the last to un-mate from each other. The interlock loop, therefore, connects after the high voltage connection elements do, and disconnects before the high voltage elements do. Because the interlock loop operates as a high voltage interlock loop (HVIL), high voltage current will not pass through the high voltage connection elements unless the interlock loop circuit is closed. Accordingly, this approach can ensure that there is no voltage across the high voltage connection elements unless and until they are properly engaged with each other, which can reduce or eliminate the likelihood for high voltage arcing, as described further below, FIG. 6 is a partially schematic, side elevation view of a representative battery connector 120 and cable connector 170 with the battery connection elements 122 sized and shaped to interface with the cable connection elements 172 in a manner that reduces the likelihood for electrical arcing at the high voltage connection elements 173, 123. Although the high voltage connection elements 173, 123, low voltage connection elements 174, 124, signal connection elements 175, 125, and interlock connection elements 176, 126 occur in two pairs (for a total of 16 elements), only a single pair of each type of element is shown in FIG. 6, for purposes of illustration.

As shown in FIG. 6, the high voltage connection element 173 of the cable connector 170 extends for a first distance D1 toward the corresponding high voltage connection element 123 carried by the battery connector 120. The remaining cable connection elements 174, 175, 176 extend for a second distance D2 less than the first distance D1. Accordingly, D1 can represent a threshold distance (or a distance to a threshold plane) beneath which at least the interlock connection element 176 is positioned. In the illustrated embodiment, the second distance D2 can be the same for the low voltage connection element 174, the signal connection element 175 and the interlock connection element 176. In some other embodiments, these distances can be different, though as discussed above, reducing or eliminating the likelihood for high voltage arcing is provided by sizing at least the interlock connection element 176 to be the last to connect (when the connectors 120, 170 are brought together, as indicated by arrow T) and the first to disconnect.

One feature of at least some of the foregoing embodiments is that the cable assembly can include electrical power lines (e.g., both high voltage and low voltage), signal lines, and an interlock loop, all housed within the same cable. An advantage of this arrangement is that it can simplify the connections made to the battery pack described above with reference to FIG. 1. In addition, the interlock loop can prevent electrical currents from flowing through the cable assembly (or at least some lines of the cable assembly) unless a secure connection is made between the cable connector and the corresponding battery connector. In particular embodiments, the interlock loop can prevent closing a circuit for the high voltage line, and in other embodiments, can prevent connecting the low power and/or signal lines as well.

Still another feature of at least some of the foregoing embodiments is that the arrangement of the interfacing elements carried by the cable connector and the battery connector (e.g., the insulating bodies and the insulating body receptacles) can significantly reduce the amount of force required to connect the cable connector with the battery connector. For example, in a representative embodiment, only five pounds of force (or less) is required to securely connect these two components.

Still another feature of at least some of the foregoing embodiments is that the overall arrangement can be more robust, physically and/or electrically, than are conventional arrangements. For example, when the body of the cable connector includes an electrical conductor, such as carbon and/or any of a variety of suitable metals, it can provide shielding from electromagnetic interference, thereby reducing the likelihood for interference with signals transmitted along the signal lines. The metal construction of the body can also support use of the cable connector outdoors, unlike some conventional high voltage battery connectors, which are typically used in garages or other indoor locations. As another example, the cable connector can be designed to connect and disconnect from a corresponding battery connector 10,000 times in some embodiments. This arrangement can allow the batteries to be removed for charging, which is unlike some conventional high voltage battery arrangements.

Still another feature of at least some of the foregoing embodiments is that the battery connector and the cable connector can include three different insulating bodies and corresponding receptacles housing the multiple electrical lines. An advantage of this arrangement is that it can reduce the likelihood for electrical contact or arcing (a) between the two high voltage lines, and/or (b) between either of the high voltage lines and any of the low power lines, signal lines, and/or interlock lines.

Figure 7A:
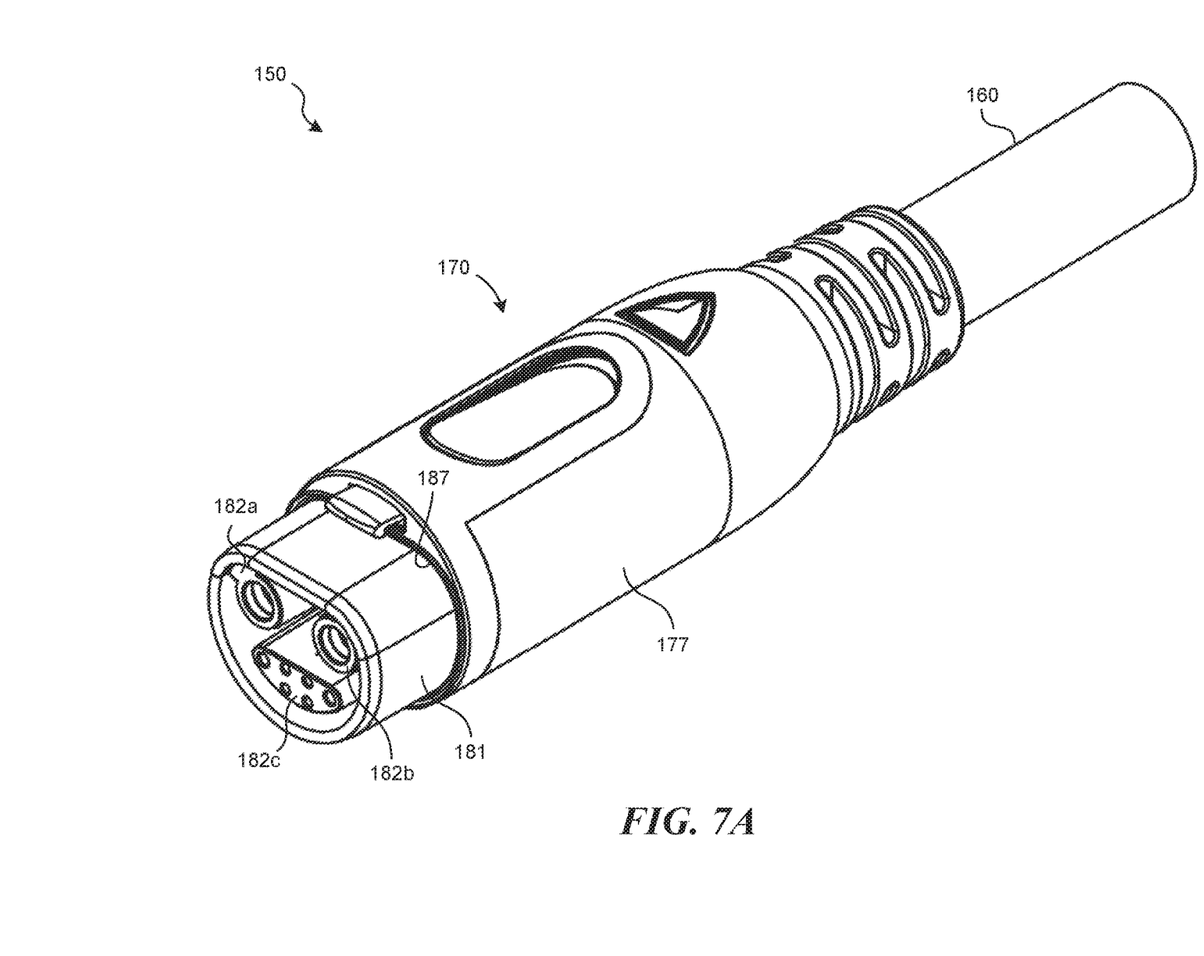
FIG. 7A is a partially schematic, isometric view of a cable assembly configured in accordance with embodiments of the present technology.

FIG. 7A is a partially schematic, isometric illustration of a cable assembly 150 having several features generally similar to those described above, along with additional features. For example, the cable assembly 150 can include a cable 160 connected to a connector 170 having a body 177 from which a flange 181 projects. The body 177 can be formed from metal or another electrically conductive material, while the flange 181 can be formed from a plastic or other material that is generally not electrically conductive.

Because the flange 181 is carried by a metal body and is received in a metal battery connector (described below with reference to FIGS. 8A and 8B), the connection elements enclosed by the flange 181 can still receive shielding from electromagnetic interference. In at least some embodiments, the connector assembly 150 can further include an electrically conductive seal 187 that provides for electrical continuity between the body 177 and the corresponding battery connector. The seal 187 can be formed from a metalized polymer, or other electrically conductive material, and can provide for more complete shielding, as well as electrical continuity between the body 177 and the corresponding battery connector, e.g., for purposes of grounding.

Figure 7B:
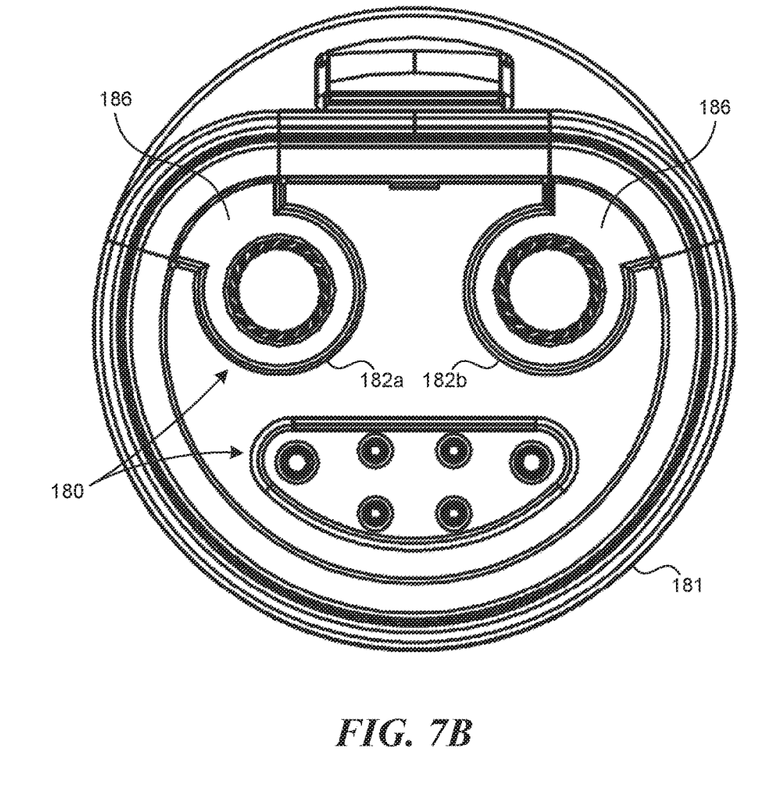
FIG. 7B is a partially schematic, end view of a cable assembly configured in accordance with embodiments of the present technology.

FIG. 7B is an end view of the cable assembly 150 shown in FIG. 7A. As shown in FIG. 7B, the first and second insulating bodies 182a, 182b can include outwardly extending supports 186 that connect the insulating bodies 182a, 182b to the surrounding flange 181. In a particular aspect of this embodiment, the flange 181 and insulating bodies 182 are formed from plastic, and the supports 186 provide additional structural integrity, particularly for the first and second insulating bodies 182a, 182b, so as to reduce the likelihood for the insulating bodies to be damaged during the normal processes of connecting and disconnecting the cable assembly 150. In addition to or in lieu of this function, the supports 186 can provide structural integrity for the flange 181, e.g., when the cable assembly is not mated with a corresponding battery connector. In such instances, the flange 181 may be exposed to contact with other equipment, and the supports 186 can resist structural damage resulting from such contact.

Figure 8A:
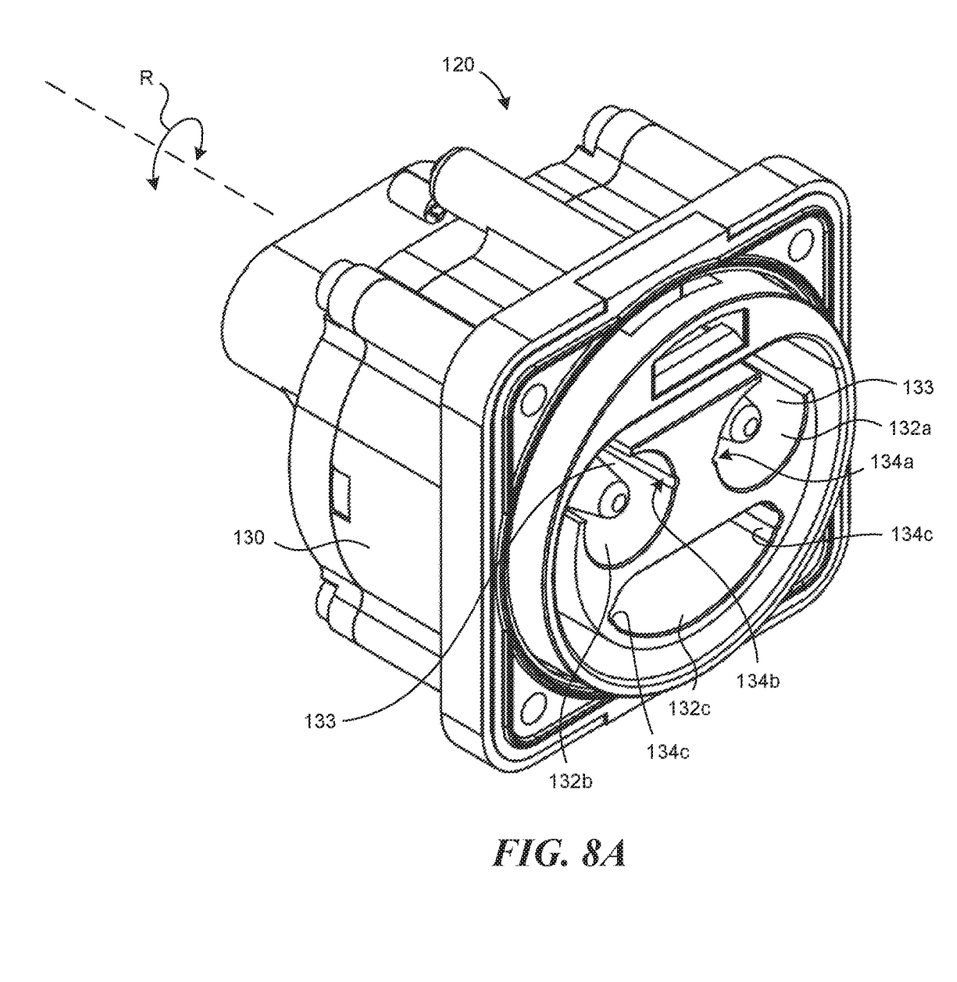
FIG. 8A is a partially schematic, isometric view of a battery connector configured in accordance with embodiments of the present technology.
Figure 8B:
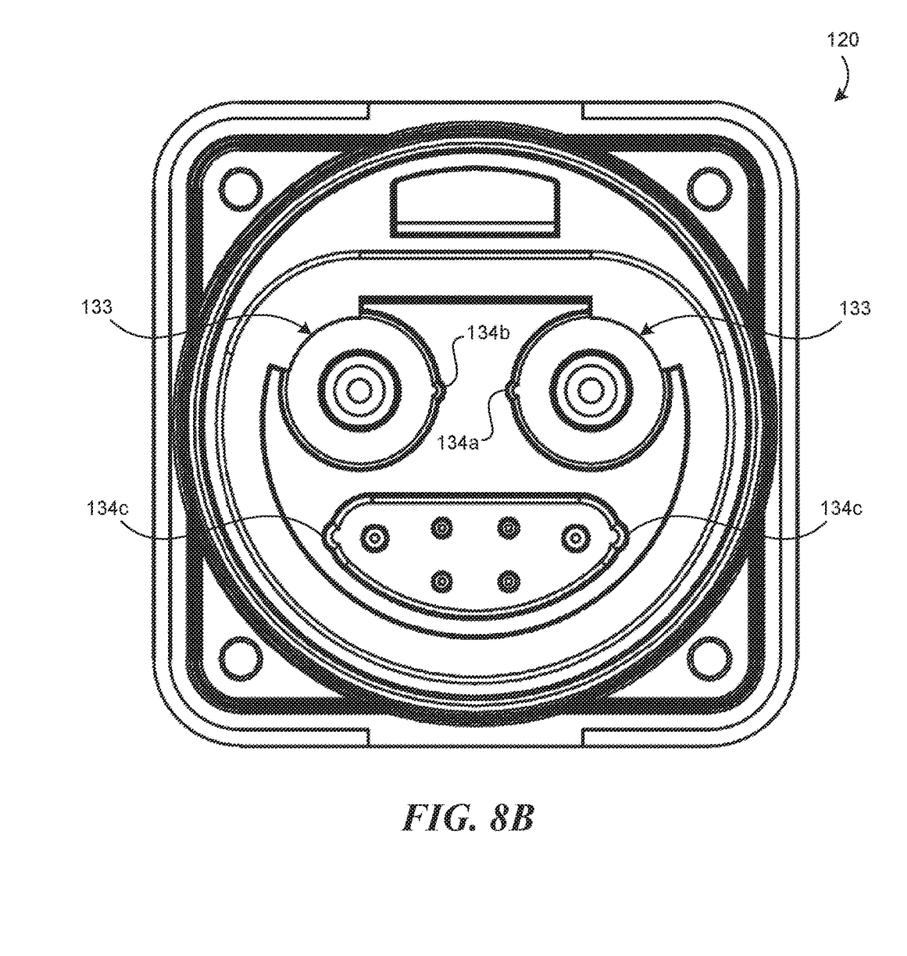
FIG. 8B is a partially schematic, front view of a battery connector configured in accordance with embodiments of the present technology.

FIGS. 8A and 8B are partially schematic, side isometric and end views, respectively, of a battery connector 120 configured to receive the cable connector 170 described above with reference to FIGS. 7A-7B. In particular, the battery connector 120 can include a metal or otherwise electrically conductive body 130 that mates with the corresponding body 177 of the cable connector 70. The first and second receptacles 132a, 132b of the battery connector 120 can each include a notch 133 in which the corresponding supports 186 of the cable connector 170 are received.

In at least some embodiments, the battery connector 120 is rotated 90° from the orientation shown in FIGS. 8A and 8B, as indicated by arrow R. The battery connector 120 can accordingly include drain channels to collect and dispose of moisture that may enter the connector 120 (e.g., when the cable connector 170 is inserted into it). For example, each of the first and second receptacles 132a, 132b can include a corresponding drain channel 134a, 134b running along the length of the receptacle. The third receptacle 132c can include two corresponding drain channels 134c running along opposing sides of the third receptacle 132c. The multiple drain channels can provide drainage for each of the corresponding receptacles, whether the receptacles are oriented 90° clockwise or counterclockwise from the orientations shown in FIGS. 8A-8B. The drain channels can also be inclined to facilitate drainage.

In at least some embodiments, the battery connector 120 shown in FIGS. 8A and 8B can accept the cable connector 170 shown in FIGS. 7A and 7B, and can also accept cable assemblies having the configuration described above with reference to FIGS. 2-3. As a result of the supports 186 carried by the cable connector 170 shown in FIGS. 7A and 7B, that cable connector 170 is compatible with the battery connector 120 of the type shown in FIGS. 8A and 8B, but not the type shown in FIG. 5.

Figure 9:
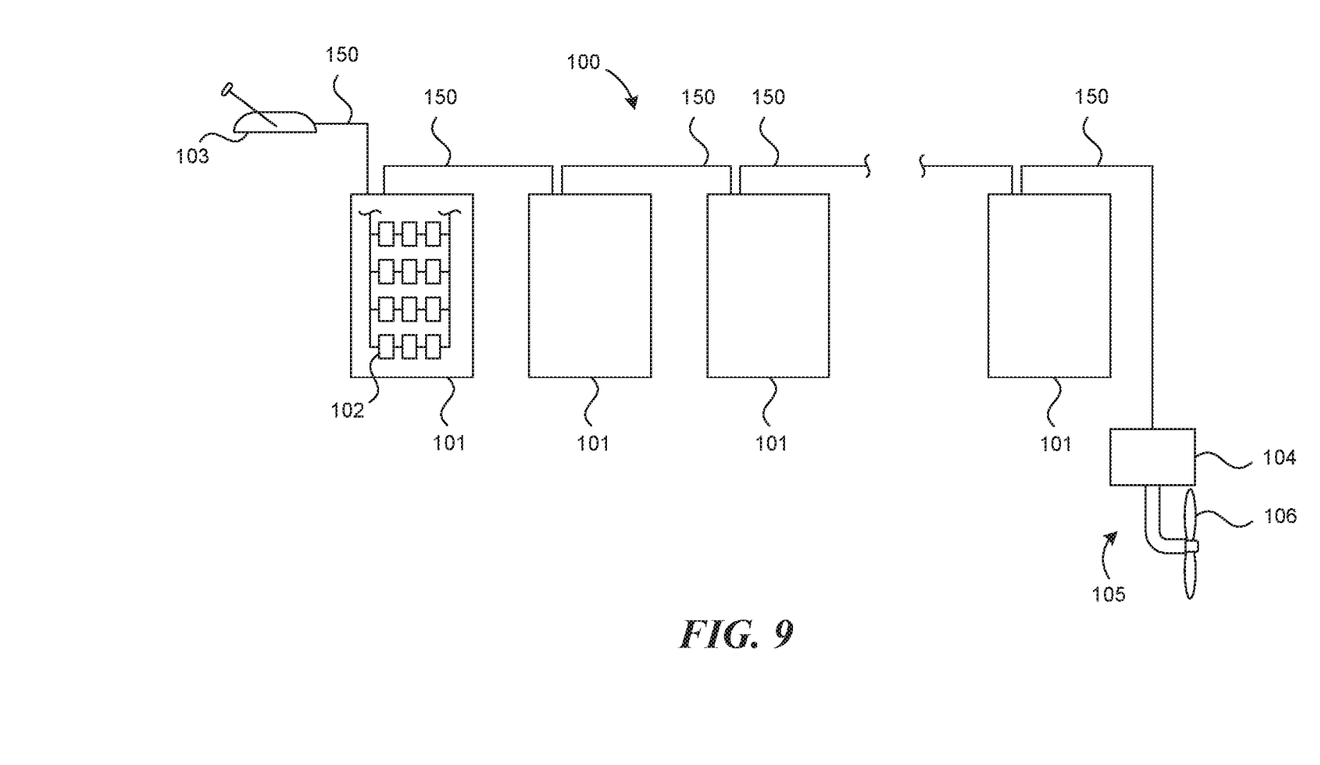
FIG. 9 is a schematic illustration of multiple battery packs coupled to provide power to an electrically driven propeller, in accordance with some embodiments of the present technology.

FIG. 9 is a partially schematic, block diagram of a representative power system 100 connected to a boat motor 104 and a corresponding throttle 103. The boat motor 104 can be coupled to a propeller 106 via a drive train 105, The throttle 103 controls the amount of power provided by the battery packs 101 to the motor 104. As shown in FIG. 5, each battery pack 101 can include multiple cells 102, including groups of cells arranged in series, with each group coupled in parallel with other groups. Each of the battery packs 101 can also be coupled in parallel with the remaining battery packs. The cable assemblies 150 provide for electrical connections between the throttle 103 and the battery packs 101, between and among the battery packs 101, and between the battery packs 101 and the motor 104. Further details of representative battery packs 101 are included in co-pending application Ser. No. 15/811,603, titled "BATTERIES FOR ELECTRIC MARINE PROPULSION SYSTEMS, AND ASSOCIATED SYSTEMS AND METHODS", filed concurrently herewith and incorporated herein by reference.

From the foregoing, it will be appreciated that specific embodiments of the presently disclosed technology have been described herein for purposes of illustration, but that various modifications may be made without deviating from the technology. For example, in an illustrated embodiment, the cable connector includes insulating bodies, and the battery connector included receptacles for receiving the insulating bodies. In other embodiments, the cable connector can include the receptacles, and the battery connector can include the insulating bodies. In other embodiments, the relative position of the male and female electrical connection elements (e.g., the cable connection elements and the battery connection elements) can be swapped. The electrically conductive components described herein can be made from (or can include) metals and/or other suitable electrically conductive materials. In particular embodiments, the high voltage lines have a voltage from 48 to 600 volts, and the low voltage lines have a voltage of from 3 to 14 volts. In other embodiments, the foregoing voltages can have other suitable values. In several embodiments, the connectors include only two high voltage power conductor lines, only two low voltage power conductor lines, only two interlock lines, and/or only two signal lines. In other embodiments, connectors having similar arrangements can house different number of the foregoing lines, e.g., at least two high voltage power conductor lines, low voltage power conductor lines, interlock lines, and/or signal lines, and corresponding connection elements.

Certain aspects of the technology described in the context of particular embodiments may be combined or eliminated in other embodiments. For example, in some embodiments, the cable need not carry all the electrical lines described above, and in further embodiments, the cable can carry additional electrical lines. The corresponding cable connectors and battery connectors can be adjusted accordingly. In some embodiments, the latching element can have configurations other than those expressly discussed above, or can be eliminated. Further, while advantages associated with certain embodiments of the disclosed technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

As used herein, the phrase "and/or," as in "A and/or B" refers to A alone, B alone, and A and B.

To the extent any materials incorporated herein by reference conflict with the present disclosure, the present disclosure controls.

We claim:

1. A connection assembly, comprising:
    a multi-conductor cable having:
        two high voltage power conductor lines;
        two low voltage power conductor lines;
        two interlock lines; and
        two signal lines;
    a connector having:
        a metal body;
        a flange having an outer edge positioned axially outwardly from the metal body, the flange forming a closed shape that encircles an interior volume;
        first, second and third insulating bodies positioned within the interior volume;
        two high voltage connector sockets, each electrically connected to a corresponding one of the high voltage power conductor lines and housed in a corresponding one of the first and second insulating bodies;
        two low voltage connector sockets, each electrically connected to a corresponding one of the low voltage power conductor lines and housed in the third insulating body;
        two interlock connector sockets, each electrically connected to a corresponding one of the interlock lines and housed in the third insulating body;
        two signal connector sockets, each electrically connected to a corresponding one of the signal lines;
        a water resistant seal carried by at least one of the metal body or the flange; and
    a latch carried by the metal body and moveable relative to the metal body between an engaged position to secure the connector to a corresponding device, and a disengaged position.

2. The connection assembly of claim 1 wherein the interlock lines are connected to an interlock circuit.

3. The connection assembly of claim 1 wherein the connector is a first connector, and wherein the connection assembly further comprises a second connector removably coupleable to the first connector, and removably latchable to the first connector via the latch.

4. The connection assembly of claim 3, further comprising a battery pack, and wherein the second connector is carried by the battery pack.

5. The connection assembly of claim 3 wherein the second connector includes:
    first, second, and third insulating body receptacles positioned to receive the first, second, and third insulating bodies, respectively;
    two high voltage connector pins, each positioned to be received by a corresponding one of the two high voltage connector sockets when the latch is in the engaged position;
    two low voltage connector pins, each positioned to be received by a corresponding one of the two low voltage connector sockets when the latch is in the engaged position;
    two interlock connector pins, each positioned to be received by a corresponding one of the two interlock connector sockets when the latch is in the engaged position; and
    two signal connector pins, each positioned to be received by a corresponding one of the two signal connector sockets when the latch is in the engaged position.

6. The connection assembly of claim 5 wherein an insertion force for engaging the first connector with the second connector and latching the latch in the secured position is five pounds or less.

7. The connection assembly of claim 5 wherein at least one of the interlock connector pins is positioned to be received by a corresponding at least one interlock connector socket, after the two high voltage pins are each received by a corresponding one of the two high voltage connector sockets as the first and second connectors are connected.

8. The connection assembly of claim 5 wherein at least one of the first, second, or third insulating body receptacles includes a drain channel.

9. The connection assembly of claim 1 wherein the outer edge of the flange defines a flange plane, and wherein a first bisecting plane normal to the flange plane defines a first region on a first side of the bisecting plane and a second region on a second side of the bisecting plane, and wherein at least some of the sockets are in the first region and at least some of the sockets are in the second region.

10. The connection assembly of claim 1 wherein the outer edge of the flange defines a flange plane, and wherein a first bisecting plane normal to the flange plane, and a second bisecting plane normal to the flange plane and the first bisecting plane define four quadrants, and wherein each quadrant includes at least one of the sockets.

11. The connection assembly of claim 1 wherein the flange is electrically conductive.

12. The connection assembly of claim 11 wherein the flange is formed from metal.

13. The connection assembly of claim 1 wherein the flange is electrically non-conductive.

14. The connection assembly of claim 13, further comprising:
    a first electrically non-conductive support element extending outwardly from the first insulating body to the flange; and
    a second electrically non-conductive support element extending outwardly from the second insulating body to the flange.

15. The connection assembly of claim 1, further comprising an electrically conductive seal disposed around the flange.

16. A connection assembly, comprising:
    a multi-conductor cable having:
        two high voltage power conductor lines;
        two low voltage power conductor lines;
        two interlock lines; and
        two signal lines;
    a connector having:
        a connector body;

two high voltage connection elements, each carried by the connector body and each electrically connected to a corresponding one of the high voltage power conductor lines;

two low voltage connection elements, each carried by the connector body and each electrically connected to a corresponding one of the low voltage power conductor lines;

two interlock connection elements, each carried by the connector body and each electrically connected to a corresponding one of the interlock lines; and two signal connection elements, each carried by the connector body and each electrically connected to a corresponding one of the signal lines.

17. The connection assembly of claim 16 wherein each of the high voltage, low voltage, interlock, and signal connection elements includes a female element carried by an insulating body.

18. The connection assembly of claim 16, further comprising
a flange having an outer edge positioned axially outwardly from the connector body, the flange forming a closed shape that encircles an interior volume, with an outer edge of flange defining a flange plane;
first, second and third insulating bodies positioned within the interior volume, wherein the high voltage connection elements include a first socket carried by the first insulating body, and a second socket carried by the second insulating body, and wherein the interlock connection elements include third and fourth sockets carried by the third insulating body, and wherein the third and fourth sockets are recessed away from the flange plane relative to the first and second sockets.

19. A connection assembly, comprising:
a multi-conductor cable having:
two high voltage power conductor lines;
two low voltage power conductor lines;
two interlock lines; and
two signal lines;
a first connector having:
a connector body;
two first high voltage connection elements, each carried by the connector body and each electrically connected to a corresponding one of the high voltage power conductor lines;
two first low voltage connection elements, each carried by the connector body and each electrically connected to a corresponding one of the low voltage power conductor lines;
two first interlock connection elements, each carried by the connector body and each electrically connected to a corresponding one of the interlock lines; and
two first signal connection elements, each carried by the connector body and each electrically connected to a corresponding one of the signal lines;
a battery pack;
a second connector carried by the battery pack, the second connector having:
two second high voltage connection elements, each positioned to engage with a corresponding one of the two first high voltage connection elements when the latch is in the engaged position;
two second low voltage connection elements, each positioned to engage with a corresponding one of the two first low voltage connection elements when the latch is in the engaged position;
two second interlock connection elements, each positioned to engage with a corresponding one of the two first interlock connection elements when the latch is in the engaged position; and
two second signal connection elements, each positioned to engage with a corresponding one of the two first signal connection elements when the latch is in the engaged position.

20. The assembly of claim 19, further comprising a seal carried by at least one of the first connector or the second connector.

21. The assembly of claim 19 wherein:
each of the two first high voltage connection elements includes a female element carried by a corresponding insulating body;
each insulating body includes a support connected to an encircling flange;
each of the two second high voltage connection elements includes a male element positioned in a corresponding receptacle; and
each receptacle includes a notch portioned to receive one of the supports when the latch is in the engaged position.

22. The connection assembly of claim 19, further comprising:
a flange having an outer edge positioned axially outwardly from the connector body, the flange forming a closed shape that encircles an interior volume, an outer edge of flange defining a flange plane;
first, second and third insulating bodies positioned within the interior volume, wherein the high voltage connection elements include a first socket carried by the first insulating body, and a second socket carried by the second insulating body, and wherein the interlock connection elements include third and fourth sockets carried by the third insulating body, and wherein the third and fourth sockets are recessed away from flange plane relative to the first and second sockets so as to engage with the corresponding second interlock connection elements only after (a) the first socket engages with one of the two second high voltage connection elements, and (b) the second socket engages with the other of the two second high voltage connection elements.

* * * * *